United States Patent
Lang et al.

(10) Patent No.: US 10,171,330 B2
(45) Date of Patent: Jan. 1, 2019

(54) INTEGRATING A COMMUNICATION BRIDGE INTO A DATA PROCESSING SYSTEM

(71) Applicant: INTERNATIONAL BUSINESS MACHINES CORPORATION, Armonk, NY (US)

(72) Inventors: Jakob C. Lang, Boeblingen (DE); Andreas Maier, Boeblingen (DE); Rene Trumpp, Boeblingen (DE); Angel Nunez Mencias, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 14/947,358

(22) Filed: Nov. 20, 2015

(65) Prior Publication Data

US 2016/0149789 A1 May 26, 2016

(30) Foreign Application Priority Data

Nov. 25, 2014 (GB) .................................. 1420905.0

(51) Int. Cl.
  *H04L 12/26* (2006.01)
  *H04L 29/06* (2006.01)
(52) U.S. Cl.
  CPC .............. *H04L 43/10* (2013.01); *H04L 69/16* (2013.01)
(58) Field of Classification Search
  CPC .................................. H04L 43/10; H04L 69/16
  See application file for complete search history.

(56) References Cited

U.S. PATENT DOCUMENTS

| 6,047,289 A * | 4/2000 | Thorne ............. G06F 17/30575 |
| 6,888,844 B2 * | 5/2005 | Mallory ................. H04L 1/0003 |
| | | 370/466 |

(Continued)

FOREIGN PATENT DOCUMENTS

CN        103957153 A       7/2014

OTHER PUBLICATIONS

Girola et al. "IBM Data Center Networking: Planning for Virtualization and Cloud Computing", Redbooks, Feb. 10, 2011.*
Search Report for GB1413977.8 dated Feb. 6, 2015, pp. 1-3.

*Primary Examiner* — Asad M Nawaz
*Assistant Examiner* — Saad A Waqas
(74) *Attorney, Agent, or Firm* — William A. Kinnaman, Esq.; Blanche E. Schiller, Esq.; Heslin Rothenberg Farley & Mesiti P.C.

(57) ABSTRACT

Integrating a further communication bridge into a running data processing system. The data processing system includes a communication client running a first operating system having no own communication stack and at least a first communication bridge running a second operating system having an own communication stack. The first communication bridge is configured as a master communication bridge. The further communication bridge announces itself as a slave communication bridge at an announcement time. The master communication bridge executes a quiesce process on the network adapter and on the API of the communication client when there are no data packets in the queue with a sending time earlier than the announcement time. The master communication bridge extracts the state of its communication stack and sends it to the further communication bridge. The master communication bridge resumes the network adapter and the API.

20 Claims, 4 Drawing Sheets

(56) References Cited

U.S. PATENT DOCUMENTS

| | | | |
|---|---|---|---|
| 7,061,858 B1 * | 6/2006 | Di Benedetto | H04L 41/00 370/219 |
| 7,467,168 B2 * | 12/2008 | Kern | G06F 11/2058 |
| 7,505,403 B2 * | 3/2009 | Santoso | H04L 45/583 370/219 |
| 7,558,195 B1 * | 7/2009 | Kuo | H04L 45/00 370/219 |
| 7,600,089 B2 * | 10/2009 | Muto | G06F 11/2074 711/112 |
| 8,248,922 B2 * | 8/2012 | Rose | H04L 12/42 370/222 |
| 8,549,364 B2 * | 10/2013 | Ziskind | G06F 11/0757 709/203 |
| 8,571,005 B1 * | 10/2013 | Vleugels | G06F 5/16 370/350 |
| 9,231,820 B2 * | 1/2016 | Murphy | H04L 69/03 |
| 9,774,401 B1 * | 9/2017 | Borrill | H04L 41/12 |
| 2012/0051340 A1 | 3/2012 | Patil et al. | |
| 2013/0212309 A1 | 8/2013 | Wong et al. | |
| 2014/0059204 A1 | 2/2014 | Nguyen et al. | |

\* cited by examiner

INTEGRATING A COMMUNICATION BRIDGE INTO A DATA PROCESSING SYSTEM

PRIOR FOREIGN APPLICATION

This application claims priority from United Kingdom (GB) patent application number 1420905.0, filed Nov. 25, 2014, which is hereby incorporated herein by reference in its entirety.

BACKGROUND

One or more aspects of the present invention relate in general to data processing systems, and in particular, to integrating a communication bridge into a data processing system and external networks.

A device for processing network communication that increases the speed of that processing and the efficiency of transferring data being communicated has been described. The protocol processing method and architecture effectively collapses the layers of a connection-based, layered architecture such as TCP/IP, into a single wider layer which is able to send network data more directly to and from a desired location or buffer on a host. This accelerated processing is provided to a host for both transmitting and receiving data, and so improves performance whether one or both hosts involved in an exchange of information have such a feature. The accelerated processing includes employing representative control instructions for a given message that allow data from the message to be processed via a fast-path which accesses message data directly at its source or delivers it directly to its intended destination. This fast-path bypasses conventional protocol processing of headers that accompany the data. The fast-path employs a specialized microprocessor designed for processing network communication, avoiding the delays and pitfalls of conventional software layer processing, such as repeated copying and interrupts to the CPU. In effect, the fast-path replaces the states that are traditionally found in several layers of a conventional network stack with a single state machine encompassing all those layers, in contrast to conventional rules that require rigorous differentiation and separation of protocol layers. The host retains a sequential protocol processing stack which can be employed for setting up a fast-path connection or processing message exceptions. The specialized microprocessor and the host intelligently choose whether a given message or portion of a message is processed by the microprocessor or the host stack.

Also, previously described is a method of generating a fast-path response to a packet received onto a network interface device where the packet is received over a TCP/IP network connection and where the TCP/IP network connection is identified at least in part by a TCP source port, a TCP destination port, an IP source address, and an IP destination address. The method includes: 1) Examining the packet and determining from the packet the TCP source port, the TCP destination port, the IP source address, and the IP destination address; 2) Accessing an appropriate template header stored on the network interface device. The template header has TCP fields and IP fields; 3) Employing a finite state machine that implements both TCP protocol processing and IP protocol processing to fill in the TCP fields and IP fields of the template header; and 4) Transmitting the fast-path response from the network interface device. The fast-path response includes the filled in template header and a payload. The finite state machine does not entail a TCP protocol processing layer and a discrete IP protocol processing layer where the TCP and IP layers are executed one after another in sequence. Rather, the finite state machine covers both TCP and IP protocol processing layers. Buffer descriptors that point to packets to be transmitted are pushed onto a plurality of transmit queues. A transmit sequencer pops the transmit queues and obtains the buffer descriptors. The buffer descriptors are then used to retrieve the packets from buffers where the packets are stored. The retrieved packets are then transmitted from the network interface device. There are two transmit queues, one having a higher transmission priority than the other. Packets identified by buffer descriptors on the higher priority transmit queue are transmitted from the network interface device before packets identified by the lower priority transmit queue.

SUMMARY

In accordance with one or more aspects, a new or recovered communication bridge is integrated into a running data processing system and external networks with increased reliability.

According to one aspect, a method of integrating a further communication bridge into a running data processing system is provided. The method includes obtaining, by a master communication bridge of the data processing system, an announcement made at an announcement time by the further communication bridge of the data processing system announcing that the further communication bridge is a slave communication bridge, the further communication bridge being a new or a recovered communication bridge, and wherein the data processing system includes a communication client running a first operating system having no own communication stack, and a first communication bridge running a second operating system having an own communication stack, wherein the first communication bridge is configured to act as the master communication bridge and wherein the further communication bridge is running a third operating system having an own communication stack; monitoring, by the master communication bridge, data packets in a queue of its communication stack; executing, by the master communication bridge, a quiesce process on a network adapter and on an application programming interface (API) of the communication client based on there being no data packets in the queue with a sending time earlier than the announcement time; extracting, by the master communication bridge, state of its communication stack and sending it to the further communication bridge; obtaining, by the master communication bridge, an indication of completion by the further communication bridge of setting the received state in its own communication stack; and resuming, by the master communication bridge, the network adapter and the API.

Computer program products and systems related to one or more aspects are also described and may be claimed herein.

BRIEF DESCRIPTION OF THE DRAWINGS

Aspects of the present invention together with the other objects and advantages may best be understood from the following detailed description of the embodiments, but not restricted to the embodiments, wherein is shown in.

DETAILED DESCRIPTION

Figure 1:
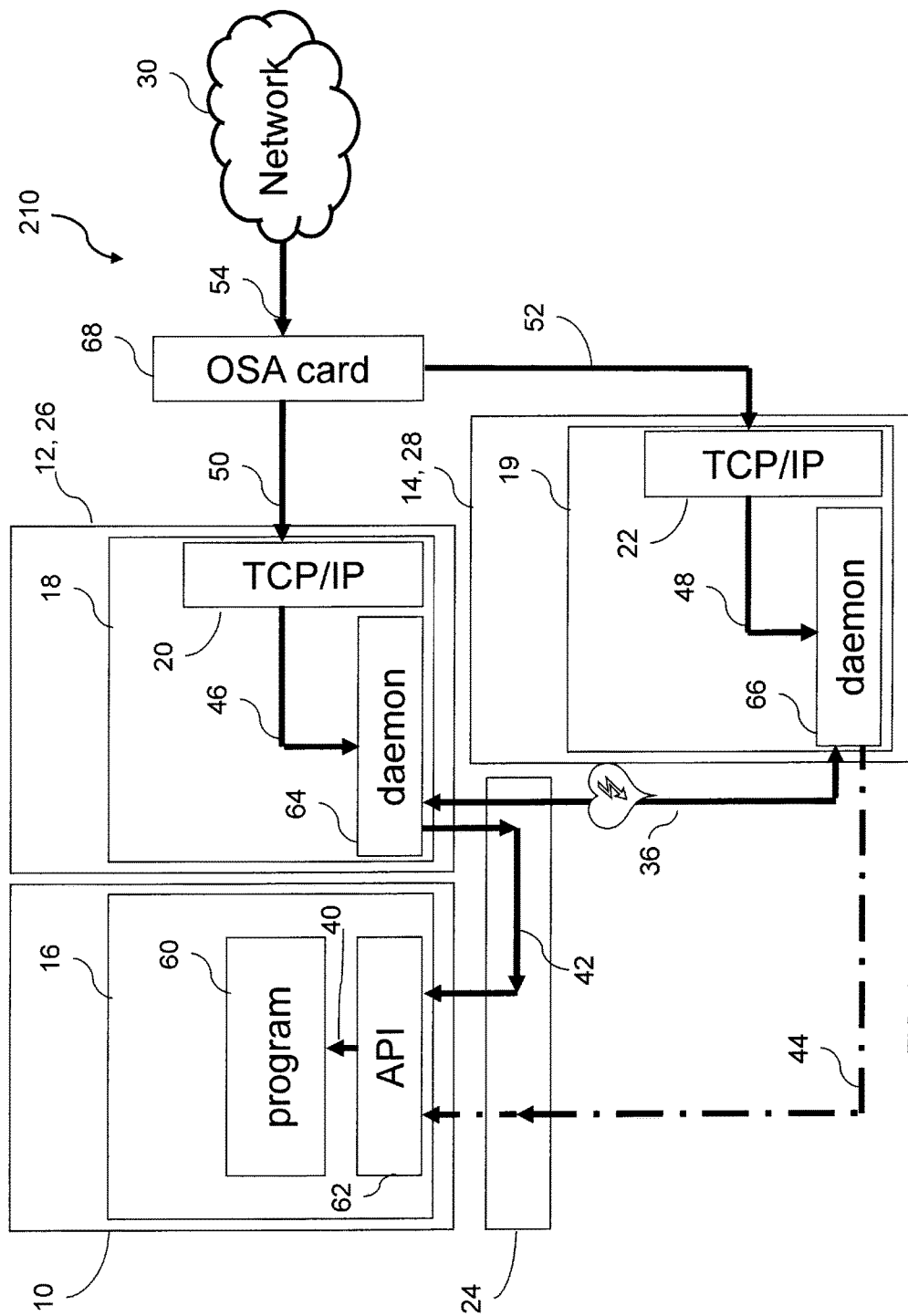
FIG. 1 a data flow of inbound communication traffic in a data processing system according to an embodiment of the invention using TCP/IP communication stacks and an OSA card for communicating with a network.

In the drawings, like elements are referred to with equal reference numerals. The drawings are merely schematic representations, not intended to portray specific parameters of aspects of the invention. Moreover, the drawings are intended to depict only typical embodiments of the invention, and therefore, should not be considered as limiting the scope of aspects of the invention.

FIG. 1 shows a data flow of inbound communication traffic in a data processing system 210 according to an embodiment of the invention using TCP/IP communication stacks 20, 22 and an OSA card as a network adapter 68 for communicating with a network 30. The network 30 is sending incoming data through the communication stacks 20, 22 to both the at least first and the further communication bridges 12, 14, where the current master communication bridge 26 is sending the incoming data to the communication client 10.

The first communication bridge 12 and the further communication bridge 14 communicate by exchanging system state information 36 on a regular basis, the system state information 36 comprising information about a status of the outgoing data and the incoming data.

The communication client 10, and/or the first communication bridge 12, and/or the further communication bridge 14 are implemented as virtual machines in the data processing system 210.

Communication between the communication client 10 and/or the communication bridges 12, 14 is performed by daemons 64, 66 running on the communication bridges 12, 14, wherein communication between the communication client 10 and/or the communication bridges 12, 14 is performed via a communication mechanism 24. The communication mechanism 24 is implemented, for instance, as a socket network. Alternatively, the communication mechanism 24 could also be implemented as a remote direct memory access network. The own communication stacks 20, 22 of the communication bridges 12, 14 are TCP stacks. The system state information 36 comprises heartbeat information. The system state information 36 contains information about a data packet count sent and/or received by the master communication bridge 26. The system state information 36 also contains information about an identifier for the last data packet sent and/or received.

The first operating system 16 and/or the second operating system 18 and/or the third operating system 19 can be a Linux operating system. Alternatively, other conventional operating systems may be used.

Data packets are sent from the network 30 via connection 54 to the OSA card 68 and from there via connections 50 and 52 to the TCP/IP communication stacks 20, 22 of the communication bridges 12, 14. The master communication bridge 26 is sending the data packets through the daemon 64 and the communication mechanism 24, implemented as a socket network, via connection 42 to the API 62 of the communication client 10, so that the data packets may be received by the program 60 running on the communication client 10. Via the system state information 36 as a heartbeat it is checked if the master communication bridge 26 is still alive and functional. The connection 44 is marked with a dash-dotted line, because the slave communication bridge 28 is not sending any data, as long as the master communication bridge 26 is still alive. Otherwise, the former slave communication bridge 28 would be switched to the new master communication bridge and the data packets would be sent by the new master communication bridge 14 to the communication client 10.

Figure 2:
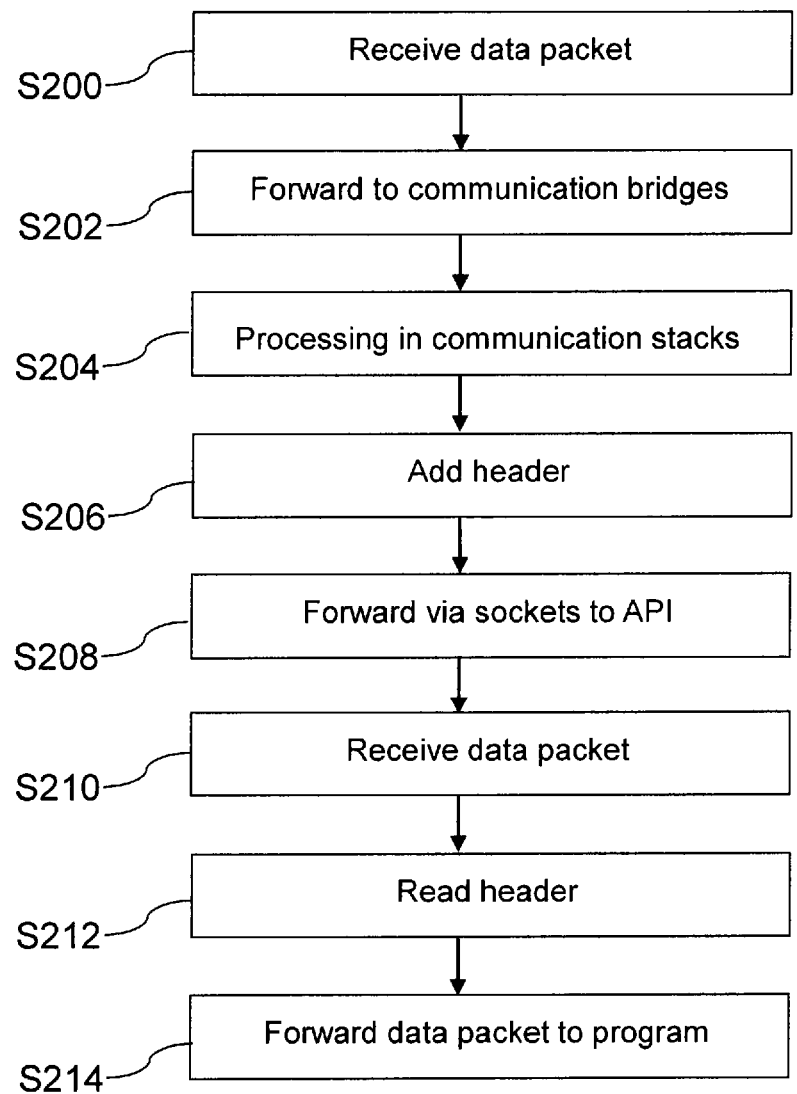
FIG. 2 a flowchart for executing inbound communication traffic in a data processing system according to an embodiment of the invention.

FIG. 2 shows one example of a flowchart for executing inbound communication traffic in a data processing system 210 according to an embodiment of the invention, as depicted in FIG. 1. The OSA card 68 receives a data packet in step S200 from a client/network 30 and forwards it in step S202 to both communication bridges 12, 14. In step S204 in both communication bridges 12, 14 the TCP/IP communication stacks 20, 22 process the data packet and forward it to the daemons 64, 66. The master daemon 64 on the master communication bridge 26 adds a header (including its internal incoming packet counter) to the data packet, step S206, and forwards the data packet (including the header) in step S208 via the socket network as a communication mechanism 24 to the API 62 on the communication client 10. The slave daemon 66 buffers the data packet. Both daemons 64, 66 increase their internal incoming packet counter. There are multiple options/alternatives of the usage of the packet counter. One packet counter may be used for each connection. Alternatively, one packet counter may be used for all connections. It is favorable for failover scenarios that the same data packets get the same internal packet counter, so that in a failover the slave communication bridge 28 can resend the correct data packets. It is also an option to use an internal packet counter based on the protocol. So, e.g., the sequence number of TCP packets may be reused. Or for user datagram protocol (UDP), no counter may be used, because this protocol is stateless and data packets may always be dropped. The API 62 receives the data packet in step S210 and reads the header, step S212. If the internal incoming packet counter is less than or equal to the internal incoming packet counter of the last received data packet, it drops the data packet (cleanup of data packets processed). The API 62 forwards the data packet to the corresponding application/program 60 in step S214.

Figure 3:
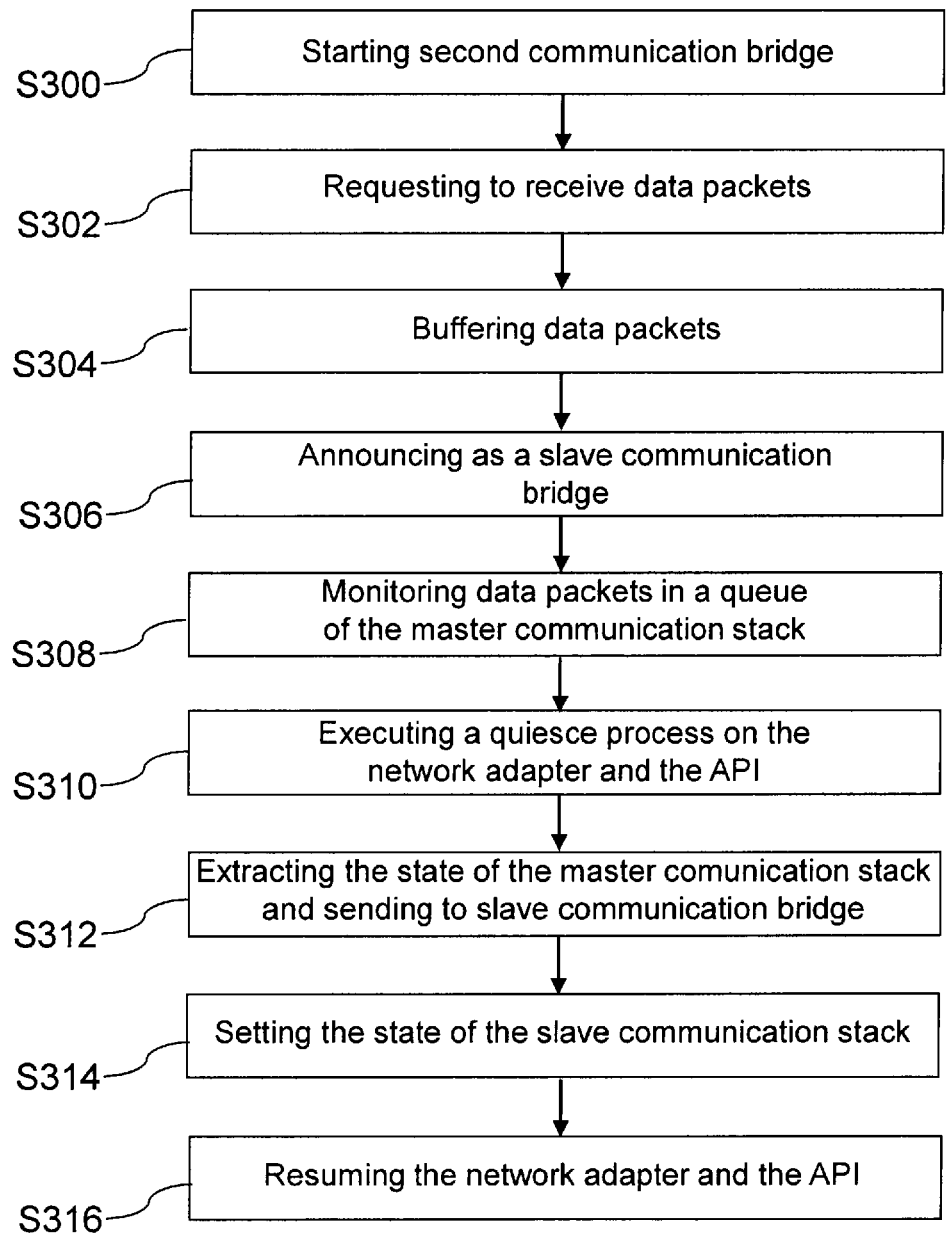
FIG. 3 a flowchart for executing one or more aspects for integrating a new or recovered communication bridge in a running data processing system according to an embodiment of the invention.

FIG. 3 is illustrating one example of an execution of one or more aspects of the method for integrating a further communication bridge 14 in a running data processing system 210 according to an embodiment of the invention. The further communication bridge 14 is a new or recovered communication bridge 14. There may be several other communication bridges present. The method allows to integrate the further communication bridge 14 into the data processing system 210, where the data processing system 210 is comprising a communication client 10 running a first operating system 16 having no own communication stack and a first communication bridge 12 running a second operating system 18 having an own communication stack 20, wherein the first communication bridge 12 is being configured to act as a master communication bridge 26 and wherein the further communication bridge 14 is running a third operating system 19 having an own communication stack 22.

The flow in FIG. 3 according one or more aspects begins by starting the further communication bridge 14 in step S300. Next in step S302, the further communication bridge 14 is requesting from a network adapter 68 and an API 62 of the communication client 10 to receive data packets they are communicating. If this is fulfilled, in step S304 the further communication bridge 14 is buffering the data packets it receives. Then, in step S306, the further communication bridge 14 is announcing itself as a slave communication bridge 28 to the master communication bridge 26 at an announcement time via a communication mechanism 24, by e.g., a heartbeat 36. When the master communication bridge 26 receives the announcement of the new slave communication bridge 28, then in step S308, the master communication bridge 26 is monitoring the data packets in a queue of its communication stack 20, followed by the master communication bridge 26 executing a quiesce process on the network adapter 68 and on the API 62 of the communication client 10 in step S310, when there are no data packets in the queue with a sending time earlier than the announcement time. Further the master communication bridge 26 is extracting in step S312 the state of its communication stack 20 and sending it to the further communication bridge 14 as a slave communication bridge 28. In step S314 the further communication bridge 14 is setting the received state in its own communication stack 22 and informing the master communication bridge 26 about completion of the step. Finally, in step S316, the master communication bridge 26 is resuming the network adapter 68 and the API 62. Thus, at the end of the flow, the master communication bridge 26 and the new or recovered further communication bridge 14 as a slave communication bridge 28 are in synchronization.

Figure 4:
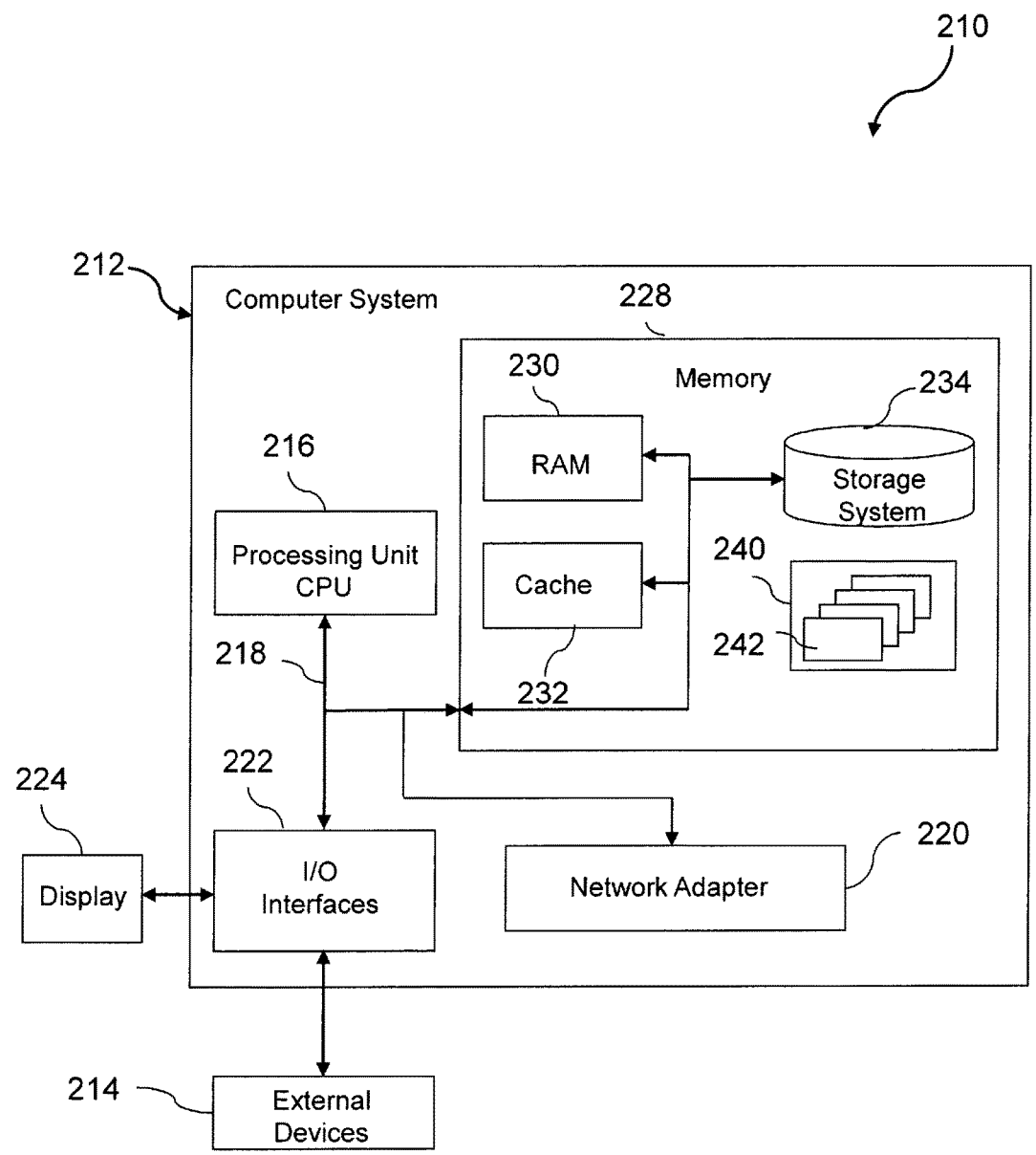
FIG. 4 an example embodiment of a data processing system for executing a method according one or more aspects of the invention.

Referring now to FIG. 4, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

The data processing system 210 is capable of running a computer program product comprising a computer usable medium including a computer readable program, wherein the computer readable program when executed on a computer system 212 causes the computer system 212 to perform a method for integrating a further communication bridge 14, being a new or recovered communication bridge 14, into the running data processing system 210, where the data processing system 210 is comprising a communication client 10 running a first operating system 16 having no own communication stack and a first communication bridge 12 running a second operating system 18 having an own communication stack 20, wherein the first communication bridge 12 is being configured to act as a master communication bridge 26 and wherein the further communication bridge 14 is running a third operating system 19 having an own communication stack 22. The method includes starting the further communication bridge 14; the further communication bridge 14 requesting from a network adapter 68 and an API 62 of the communication client 10 to receive data packets; and, the further communication bridge 14 buffering the data packets. Further, the method includes the further communication bridge 14 announcing itself as a slave communication bridge 28 to the master communication bridge 26 at an announcement time; the master communication bridge 26 monitoring the data packets in a queue of its communication stack 20; and the master communication bridge 26 executing a quiesce process on the network adapter 68 and on the API 62 of the communication client 10 when there are no data packets in the queue with a sending time earlier than the announcement time. Further, the method includes the master communication bridge 26 extracting the state of its communication stack 20 and sending it to the further communication bridge 14; the further communication bridge 14 setting the received state in its own communication stack 22 and informing the master communication bridge 26 about completion; and finally, the master communication bridge 26 resuming the network adapter 68 and the API 62.

In data processing system 210, there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, according to one aspect of the invention, a method is provided for integrating a further communication bridge, being a new or recovered communication bridge, into a running data processing system, the data processing system comprising a communication client running a first operating system having no own communication stack and at least a first communication bridge running a second operating system having an own communication stack, wherein the first communication bridge being configured to act as a master communication bridge and wherein the further communication bridge is running a third operating system having an own communication stack. The method includes starting the further communication bridge; the further communication bridge requesting from a network adapter and an API of the communication client to receive data packets; the further communication bridge buffering the data packets. The method further includes the further communication bridge announcing itself as a slave communication bridge to the master communication bridge at an announcement time; the master communication bridge monitoring the data packets in a queue of its communication stack; the master communication bridge executing a quiesce process on the network adapter and on the API of the communication client when there are no data packets in the queue with a sending time earlier than the announcement time. Further, the method includes the master communication bridge extracting the state of its communication stack and sending it to the further communication bridge; the further communication bridge setting the received state in its own communication stack and informing the master communication bridge about completion; and the master communication bridge resuming the network adapter and the API.

A communication bridge is defined as a computing platform being implemented as a virtual or physical machine and running an own operating system, which may be Linux or any other commercial or proprietary operating system. The third operating system of the further communication bridge may be the same kind of operating system as the second operating system of the first communication bridge. Alternatively, the operating systems may be different kinds of operating systems.

A communication client is defined as a computing platform being implemented as a virtual or physical machine and running an own operating system, which may be any commercial or proprietary operating system. The communication client utilizes one or more services from a communication bridge. The communication client may be implemented as a server, but is called a client because it uses services from the communication bridges as a client.

Selected communication stack (e.g. TCP/IP, or other protocol stack) applications running on the communication client can communicate with a communication stack of a communication bridge without using a communication stack on the communication client. All socket requests, for example, may be transparently forwarded to the communication bridge, operating on the same virtual machine, or as another virtual machine on the same data processing system, or operating on a different data processing system.

Thus, it is not necessary to develop communication stacks, such as a TCP/IP stack, for all available computing platforms, but instead it is possible to utilize already developed communication stacks on certain computing platforms, which may be accessed by employing one or more aspects of the method of communicating between a communication client and communication bridges.

Further, it is not necessary to develop code/support for a new hardware, such as a new network card, for all available computing platforms, but instead, it is possible to utilize already developed communication stacks on certain computing platforms, which may be accessed by employing one or more aspects of the method of communicating between a communication client and communication bridges.

The reliability of routing communication in a computing environment is increased by using, e.g., more than one communication bridge on a data processing system. The communication bridges are extended to exchange system state information, like a heartbeat, with the other communication bridges and do a failover if necessary, i.e. change a former slave communication bridge to a new master communication bridge, if the former master communication bridge fails.

A heartbeat can generally be understood as a periodic signal generated by hardware or software to indicate normal operation or to synchronize other parts of the data processing system. Usually, a heartbeat is sent between communication bridges at a regular interval of the order of milliseconds. If a heartbeat isn't received for a time usually a few heartbeat intervals—the communication bridge that should have sent the heartbeat is assumed to have failed.

One or more aspects aim at adding recoverability to a redundant data processing system, as for example, a Linux fast-path environment. In one example, a method is described for integrating a new or recovered communication bridge into existing network connections without disruption of the running data processing system. This is enabled by extending a communication stack with an application programming interface (API) in order to be able to read/set the TCP stack state, concerning a data packet counter for connections and the like. The data processing system where the new or recovered communication bridge is integrated in, may be running already at least one first communication bridge, so that the new or recovered communication bridge would be the second communication bridge in the data processing system. Yet there could also be already more than one communication bridge running in the data processing system, so that the new or recovered communication bridge would only be one additional communication bridge running in the data processing system.

One or more aspects enable a hot plug of a new communication bridge or recovering of a temporary failure of a communication bridge. In both scenarios according to one or more aspects, the new or recovered communication bridge will be integrated in a current high availability setup of a data processing system. Thus, it is also possible to integrate existing connections into a new communication bridge which is of considerable advantage for maintenance situations, where no cold start needs to be carried out. Further, a recovery of the redundancy of a data processing system, and an increase in capacity of the data processing system are provided. One or more aspects may pertain to long lasting connections over hours or even days.

According to one or more aspects, a new or recovered communication bridge will be started on the data processing system. Then, the new or recovered communication bridge requests from a network adapter, like an OSA card and an API of a communication client, to get all data packets they are transferring. If a daemon running on the new or recovered communication bridge gets the data packets, the daemon buffers the data packets. Then the daemon announces itself as a new slave daemon to a daemon running on the master communication bridge being executed on the data processing system, e.g. via a heartbeat connection. When the master daemon receives the announcement of the new slave daemon, it monitors the data packets in the queue of its communication stack. When there are no older data packets than the point in time when it received the announcement, then it executes a quiesce process on the network adapter for this communication bridge and on the API of the communication client. The master daemon extracts the state of the communication stack and sends it to the slave daemon. The slave daemon sets the state it received in its own communication stack and informs the master daemon about completion. After that the master daemon resumes the network adapter and the API. Now the master daemon and the slave daemon, and thus the communication bridges they are running, are synchronized.

In one embodiment, the first communication bridge and the further communication bridge communicate by exchanging system state information on a regular basis, the system state information comprising information about a status of the outgoing data and the incoming data.

The communication client, and/or the first communication bridge, and/or the further communication bridge are implemented, e.g., as virtual machines in the data processing system.

Virtual machines or logical partitions are commonly used in data processing systems, and thus, may be used as a computing platform implementing one or more aspects of the method.

Due to one embodiment, communication between the communication client and/or the communication bridges may be performed by daemons running on the communication bridges. Daemons are background processes running under the operating systems of the communication bridges fulfilling requests by communication mechanisms by forwarding them to the communication stacks. Daemons process data packets received from the network adapters and translate them for the communication mechanisms.

In one embodiment, communication between the communication client and/or the communication bridges may be performed via a communication mechanism. The communication mechanism is ensuring communication between logical partitions or virtual machines in a data processing system.

In one embodiment, the communication mechanism may be implemented as a socket network. Sockets as a bidirectional software interface for inter-process or network communication may serve as an embodiment for a network with high reliability, and therefore, be used in one or more aspects.

Alternatively, the communication mechanism could be implemented as a remote direct memory access network (RDMA). This communication mechanism too is widely used for network communication and is suited for being used by one or more aspects.

In one embodiment, the system state information may comprise heartbeat information. A heartbeat, being defined as a periodic signal generated by hardware or software to indicate normal operation or to synchronize other parts of the data processing system, may be used by one or more aspects. Usually, a heartbeat is sent between communication bridges at a regular interval of the order of milliseconds. If a heartbeat isn't received for a time—usually a few heartbeat intervals—the communication bridge that should have sent the heartbeat is assumed to have failed.

Due to one embodiment, the own communication stack of a communication bridge may be a TCP stack. More specifically, a communication stack implemented in the data processing system where one or more aspects is used, may comprise a TCP/IP stack, too. The TCP/IP stack is outside of the operating system of the communication client, and thus, only one driver (e.g. hardware device driver) has to be developed which may be used by a number of different operating systems, from where a communication client is accessing this TCP/IP stack outside of its own operating system. This may be a very cost effective manner to operate a network interface.

In one embodiment, the first operating system and/or the second operating system and/or the third operating system is a Linux operating system. Linux operating systems are commonly used open source operating systems, exhibiting a very cost efficient possibility to be implemented on a variety of communication bridges.

According to one embodiment, the system state information may contain information about a data packet count sent and/or received by the master communication bridge. Thus, after a failure of the master communication bridge and a possible change of the master communication bridge to one of the other former slave communication bridges, the necessary information will be available to continue the communication traffic. By this technique, there will not be any loss of data packets sent or received by the communication client.

The system state information may contain information about an identifier for the last data packet sent and/or received. This feature exhibits a very efficient way of ensuring that no data packet will be lost after a failure of the master communication bridge and a continuation of the communication traffic by a new master communication bridge.

According to a further aspect of the invention, a data processing program for execution in a data processing system is proposed comprising an implementation of an instruction set for performing a method as described above when the data processing program is run on a computer.

Further, a computer program product is provided comprising a computer usable medium including a computer readable program, wherein the computer readable program when executed on a computer causes the computer to perform a method for integrating a further communication bridge, being a new or recovered communication bridge into a running data processing system, the data processing system comprising a communication client running a first operating system having no own communication stack and at least a first communication bridge running a second operating system having an own communication stack, wherein the first communication bridge being configured to act as a master communication bridge and wherein the further communication bridge is running a third operating system having an own communication stack. The method includes starting the further communication bridge; the further communication bridge requesting from a network adapter and an API of the communication client to receive data packets; the further communication bridge buffering the data packets. Then the method further includes the further communication bridge announcing itself as a slave communication bridge to the master communication bridge at an announcement time; the master communication bridge monitoring the data packets in a queue of its communication stack; the master communication bridge executing a quiesce process on the network adapter and on the API of the communication client when there are no data packets in the queue with a sending time earlier than the announcement time. Further, the method includes the master communication bridge extracting the state of its communication stack and sending it to the further communication bridge; the further communication bridge setting the received state in its own communication stack and informing the master communication bridge about completion; and the master communication bridge resuming the network adapter and the API.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is provided, comprising software code portions for performing a method described herein.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method of integrating a further communication bridge into a running data processing system, the method comprising:

obtaining, by a master communication bridge of the data processing system, an announcement made at an announcement time by the further communication bridge of the data processing system announcing that the further communication bridge is a slave communication bridge, the further communication bridge being a new or a recovered communication bridge, and wherein the data processing system includes a communication client running a first operating system having no own communication stack, and a first communication bridge running a second operating system having an own communication stack, wherein the first communication bridge is configured to act as the master communication bridge and wherein the further communication bridge is running a third operating system having an own communication stack, wherein master and slave are designations that are switched from one communication bridge to another communication bridge based on a failure of the one communication bridge, wherein the first communication bridge and the further communication bridge communicate by exchanging system state information on a regular basis, the system state information including at least one of information about a data packet count sent or received by the master communication bridge or information about an identifier for a last data packet sent or received;

monitoring, by the master communication bridge, data packets in a queue of its communication stack;

executing, by the master communication bridge, a quiesce process to quiesce processing on a network adapter and on an application programming interface (API) of the communication client based on there being no data packets in the queue with a sending time earlier than the announcement time;

extracting, by the master communication bridge, state of its communication stack and sending it to the further communication bridge;

obtaining, by the master communication bridge, an indication of completion by the further communication bridge of setting the received state in its own communication stack; and resuming, by the master communication bridge, the network adapter and the API, wherein the master communication bridge and the further communication bridge are in synchronization.

2. The method according to claim 1, wherein the system state information comprises at least one of information about a status of outgoing data or incoming data, or heartbeat information.

3. The method according to claim 1, wherein at least one of the communication client, the first communication bridge, or the further communication bridge is implemented as a virtual machine in the data processing system.

4. The method according to claim 1, wherein communication between the communication client and at least the master communication bridge is performed by one or more daemons running at least the master communication bridges.

5. The method according to claim 1, wherein communication between the communication client and at least the master communication bridge is performed via a communication mechanism.

6. The method according to claim 5, wherein the communication mechanism is implemented as a socket network.

7. The method according to claim 5, wherein the communication mechanism is implemented as a remote direct memory access network.

8. The method according to claim 1, wherein the own communication stack is a transmission control protocol stack.

9. A computer system for integrating a further communication bridge into a running data processing system, the computer system comprising:

a memory; and a processor in communication with the memory, wherein the computer system is configured to perform a method, said method comprising:

obtaining, by a master communication bridge of the data processing system, an announcement made at an announcement time by the further communication bridge of the data processing system announcing that the further communication bridge is a slave communication bridge, the further communication bridge being a new or a recovered communication bridge, and wherein the data processing system includes a communication client running a first operating system having no own communication stack, and a first communication bridge running a second operating system having an own communication stack, wherein the first communication bridge is configured to act as the master communication bridge and wherein the further communication bridge is running a third operating system having an own communication stack, wherein master and slave are designations that are switched from one communication bridge to another communication bridge based on a failure of the one communication bridge, wherein the first communication bridge and the further communication bridge communicate by exchanging system state information on a regular basis, the system state information including at least one of information about a data packet count sent or received by the master communication bridge or information about an identifier for a last data packet sent or received;

monitoring, by the master communication bridge, data packets in a queue of its communication stack;

executing, by the master communication bridge, a quiesce process to quiesce processing on a network adapter and on an application programming interface (API) of the communication client based on there being no data packets in the queue with a sending time earlier than the announcement time;

extracting, by the master communication bridge, state of its communication stack and sending it to the further communication bridge;

obtaining, by the master communication bridge, an indication of completion by the further communication bridge of setting the received state in its own communication stack; and resuming, by the master communication bridge, the network adapter and the API, wherein the master communication bridge and the further communication bridge are in synchronization.

10. The computer system according to claim 9, wherein at least one of the communication client, the first communication bridge, or the further communication bridge is implemented as a virtual machine in the data processing system.

11. The computer system according to claim 9, wherein communication between the communication client and at least the master communication bridge is performed by one or more daemons running on at least the master communication bridge.

12. The computer system according to claim 9, wherein communication between the communication client and at least the master communication bridge is performed via a communication mechanism.

13. The computer system according to claim 9, wherein the system state information comprises at least one of information about a status of outgoing data or incoming data, or heartbeat information.

14. The computer system according to claim 9, wherein the own communication stack is a transmission control protocol stack.

15. A computer program product for integrating a further communication bridge into a running data processing system, the computer program product comprising:

a computer readable storage device readable by a processing circuit and storing instructions for execution by the processing circuit for performing a method comprising:

obtaining, by a master communication bridge of the data processing system, an announcement made at an announcement time by the further communication bridge of the data processing system announcing that the further communication bridge is a slave communication bridge, the further communication bridge being a new or a recovered communication bridge, and wherein the data processing system includes a communication client running a first operating system having no own communication stack, and a first communication bridge running a second operating system having an own communication stack, wherein the first communication bridge is configured to act as the master communication bridge and wherein the further communication bridge is running a third operating system having an own communication stack, wherein master and slave are designations that are switched from one communication bridge to another communication bridge based on a failure of the one communication bridge, wherein the first communication bridge and the further communication bridge communicate by exchanging system state information on a regular basis, the system state information including at least one of information about a data packet count sent or received by the master communication bridge or information about an identifier for a last data packet sent or received;

monitoring, by the master communication bridge, data packets in a queue of its communication stack;

executing, by the master communication bridge, a quiesce process to quiesce processing on a network adapter and on an application programming interface (API) of the communication client based on there being no data packets in the queue with a sending time earlier than the announcement time;

extracting, by the master communication bridge, state of its communication stack and sending it to the further communication bridge;

obtaining, by the master communication bridge, an indication of completion by the further communication bridge of setting the received state in its own communication stack; and resuming, by the master communication bridge, the network adapter and the API, wherein the master communication bridge and the further communication bridge are in synchronization.

16. The computer program product according to claim 15, wherein at least one of the communication client, the first communication bridge, or the further communication bridge is implemented as a virtual machine in the data processing system.

17. The computer program product according to claim 15, wherein communication between the communication client and at least the master communication bridge is performed by one or more daemons running on at least the master communication bridge.

18. The computer program product according to claim 15, wherein communication between the communication client and at least the master communication bridge is performed via a communication mechanism.

19. The computer program product according to claim 15, wherein the system state information comprises at least one of information about a status of outgoing data or incoming data, or heartbeat information.

20. The computer program product according to claim 15, wherein the own communication stack is a transmission control protocol stack.

* * * * *